Nov. 1, 1932. T. H. WITTLIFF 1,885,664
FURNITURE BRACE
Filed March 4, 1927
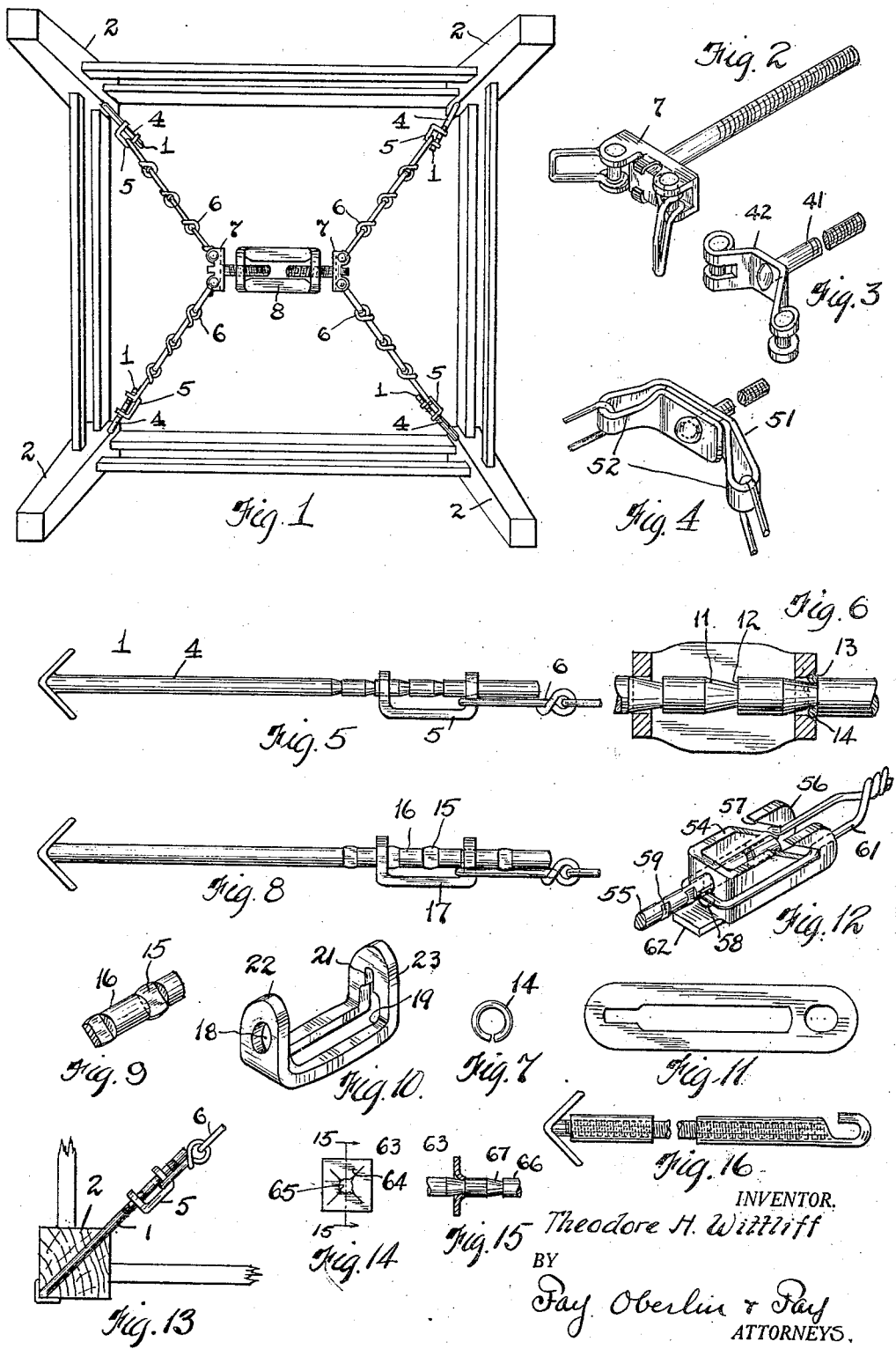
INVENTOR.
Theodore H. Wittliff
BY
Fay, Oberlin & Fay
ATTORNEYS.

Patented Nov. 1, 1932

1,885,664

UNITED STATES PATENT OFFICE

THEODORE H. WITTLIFF, OF CLEVELAND, OHIO

FURNITURE BRACE

Application filed March 4, 1927. Serial No. 172,594.

This invention as indicated relates to a furniture brace. More particularly it comprises an apparatus for engaging the end posts of a framed article of furniture and applying tension to said posts so as to retain the members of said framed structure in rigid relation to each other.

The apparatus is designed to be readily applied to a chair or other article of furniture with a minimum of effort and at the same time to provide for adequate strength of the various parts to permit a high degree of tension to be placed upon the structure.

To the accomplishment of the foregoing and related ends, said invention, then consists of the means hereinafter fully described and particularly pointed out in the claim.

The annexed drawing and the following description set forth in detail certain mechanism embodying the invention, such disclosed means constituting, however, but several of various mechanical forms in which the principle of the invention may be used.

In said annexed drawing:

Fig. 1 is a bottom perspective view of a chair equipped with tensioning apparatus embodying the principle of my invention; Fig. 2 is a perspective view of one form of terminal member for the turnbuckle; Figs. 3 and 4 are views similar to Fig. 2 showing modified forms of terminal members for turnbuckles; Fig. 5 is a top plan view of a corner post bolt with a simple form of adjustable terminal member; Fig. 6 is an enlarged detail view, partly in section showing the adjustable terminal member illustrated in Fig. 5; Fig. 7 is a detail view of a split ring used with the device shown in Figs. 5 and 6; Fig. 8 is a top plan view of a modified form of adjustable terminal member; Figs. 9 and 10 are perspective views respectively of the notched bolt shank and adjustable terminal member used in the construction shown in Fig. 8; Fig. 11 is a plan view of a blank used to form the member shown in Fig. 10; Fig. 12 is a perspective view of a modified form of terminal member showing means for connecting a wire to a bolt shank having a notched stem; Fig. 13 is a top plan view, with a portion shown in section, illustrating the manner in which a securing bolt is connected with the corner post of a framed structure; Fig. 14 is a front elevation of a securing plate for co-operating with a notched bolt stem; Fig. 15 is a sectional view taken along the line 15—15 shown in Fig. 14, looking in the direction of the arrows; and Fig. 16 is a view showing a modified form of bolt and terminal member.

As is clearly shown in Fig. 1 of the drawing, the apparatus comprises a plurality of angle-headed bolts 1 adapted to be engaged diagonally through the corner posts 2 of a framed structure 3 and having means adjacent their opposite ends adapted to be engaged by a cable fastening device.

In Fig. 1 the bolt shanks 4 are notched and are adapted to be engaged by U-shaped plates 5, which are adapted to be engaged by cables or flexible members 6. In the form shown, the cables or flexible members are chains of standard form. The inner ends of the chains are connected to the terminal members of the central tensioning device or turnbuckle 8.

Several different constructions for connecting the cable with the shank of the corner post bolt are illustrated. In the form shown in Figs. 5 and 6, the angle-headed bolt 1, has a stem or shank 4, which is provided with a series of circumferential notches having inclined faces 11 cut so as to form shoulders 12 adjacent one side.

The cable attaching device used with this form of construction comprises a plate 5 having its ends turned up to provide a U-shaped member, the ends being provided with apertures to engage over the stem. Adjacent one of the apertures, a circular seat 13 is provided to receive a split ring 14. The split ring is formed of wire and is of a size to snugly fit about the notched portion of the stem behind one of the shoulders. It is placed in position by spreading the ring to slide over the main body portion of the stem and then moving it over the stem until a notch at the desired point of attachment of the cable to the stem is reached. When so engaged behind one of the shoulders, the plate is moved toward the ring so that its countersunk seat portion engages over the ring and holds it securely in locked position behind the shoulder. The terminal loop of the flexible member or chain is engaged over the plate adjacent the end enclosing the split ring. In this manner a simple, readily adjustable securing device is provided which will withstand a high degree of tension applied to the flexible members by means of the turnbuckle.

In the form of construction shown in Fig. 8, notches 15 are formed at intervals along either side of the stem 16 by subjecting the stem to heavy pressure. This provides a series of narrowed sections along the stem with a slight displacement of metal above and below the position of said notches. The cable securing device for a bolt of the type shown in Fig. 8 is preferably formed from a plate in the manner illustrated in Figs. 10 and 11. The plate 12 as shown is formed with an elliptical opening 18 adjacent one end and an elongated slot 19 throughout the remainder of its body portion. The elongated slot ends in a narrow slot extension 21 at the opposite end of the plate and the ends 22, 23, of the plate are turned upwardly. The plate as will be readily understood, may then be engaged over the stem of the securing bolt by sliding the end of the stem through the elliptical aperture with the terminal loop of the flexible member engaged over the plate, and then through the enlarged portion of the slot. When it is desired to lock the securing plate upon the stem of the bolt, the narrowed slot extension is engaged over one of the narrowed portions of the stem. In order to lock the narrowed slot extension in secure engagement with the stem, it is only necessary to draw the loop of the flexible member, shown in the drawing as a chain link, toward that end of the plate. This will firmly hold said end of the plate from movement to releasing position so long as tension is maintained upon the flexible member.

The flexible members illustrated are in the form of chains 6 which are engaged over the attaching plates 5 at their outer ends and over pins 31 at their inner ends, supported in the terminal members 7 of the turnbuckle. The pins are mounted in (see Fig. 2) plates 32, of channel like form, having pairs of parallel ears 33 at each end apertured to receive the same. A square-headed bolt 34 of standard form is engaged through a central opening in the plate and the head of the bolt is adapted to be held in position by clamping fingers 35 formed integrally on each edge of the plate.

Another form of the terminal is illustrated in Fig. 3 wherein the bolt 41 is centrally secured in a body member 42, the ends 43 of said body member being slotted and bent upon themselves to engage the pivot pins 44 upon which the terminal links of the respective chains may be engaged.

In the form of construction shown in Fig. 4, the plate for securing the flexible members to the turnbuckle is disclosed as comprising a metal strap 51 folded upon itself at either end to form loops 52 and provided with a central aperture within which a bolt 53 is secured. In Fig. 12 there is illustrated a terminal plate 54 for a corner post bolt 55 which is formed by bending the ends 56 in parallel relation and providing them with oblique slots 57 to form hooks. In the rearward face of said plate a keyhole slot 58 is provided, the enlarged portion of which is adapted to be engaged over the stem of said bolt and the narrow portion of which is adapted to engage one of the notched sections 59 along said shank. When a wire 61 is to be applied to the construction of the character illustrated in Fig. 12, the wire may be engaged between the shank of the bolt 55 and a rearwardly turned lip 62 formed on said terminal member. The wire may then be threaded beneath the hooks and extended to any point desired.

In the form of construction illustrated in Figs. 14 and 15 a small plate 63 is provided which is slotted at diagonal corners to provide a series of resilient tongues 64. Said plate is provided with a central aperture 65 of somewhat less diameter than that of the shank of the corner post bolts 66; thus, when the plate is engaged over the shank of said bolts, the tongue portions thereof will snap downwardly into the circumferential notches 67 on said shank and will serve as an abutment for locking any cable engaging member such as I have illustrated in Figs. 1, 5, 8, 10, 12 and 13, the keyhole slot or split ring being omitted in such instance and openings being substituted of a size to receive the stem of the bolt.

In lieu of using notches either circumferential or lateral for engaging the cable holding clips, I have provided a corner bolt 71 (see Fig. 16) having a diagonal head 72 and formed with a screw threaded shank 73 which is adapted to be engaged by a tubular member 74 preferably formed of a plate of material rolled to cylindrical form and having one end formed into a hook 75.

Other modes of applying the principle of my invention may be employed instead of the one explained, change being made as regards the mechanism herein disclosed, provided the means stated by the following claim or the equivalent of such stated means be employed.

I particularly point out and distinctly claim as my invention:

A securing device for furniture braces, comprising a terminal member having a shank, a fastening member having a body portion and angularly disposed ends provided with apertures adapted to engage over said shank in freely slidable relation thereto, means permitting transverse movement of one end portion, and shoulder portions on said shank and fastening member adapted to interlock at predetermined spaced points of adjustment along said shank, and a flexible member having a loop adapted to be engaged between said fastening member and said shank and movable longitudinally with respect thereto to a position below the transversely movable portion of said fastening member to latch said fastening member in predetermined adjustment with said shank.

Signed by me this 26th day of February, 1927.

THEODORE H. WITTLIFF.